Nov. 17, 1925.  
J. B. HOLTZ  
DISPLAY DEVICE  
Filed April 15, 1925  
1,562,236  
4 Sheets-Sheet 4
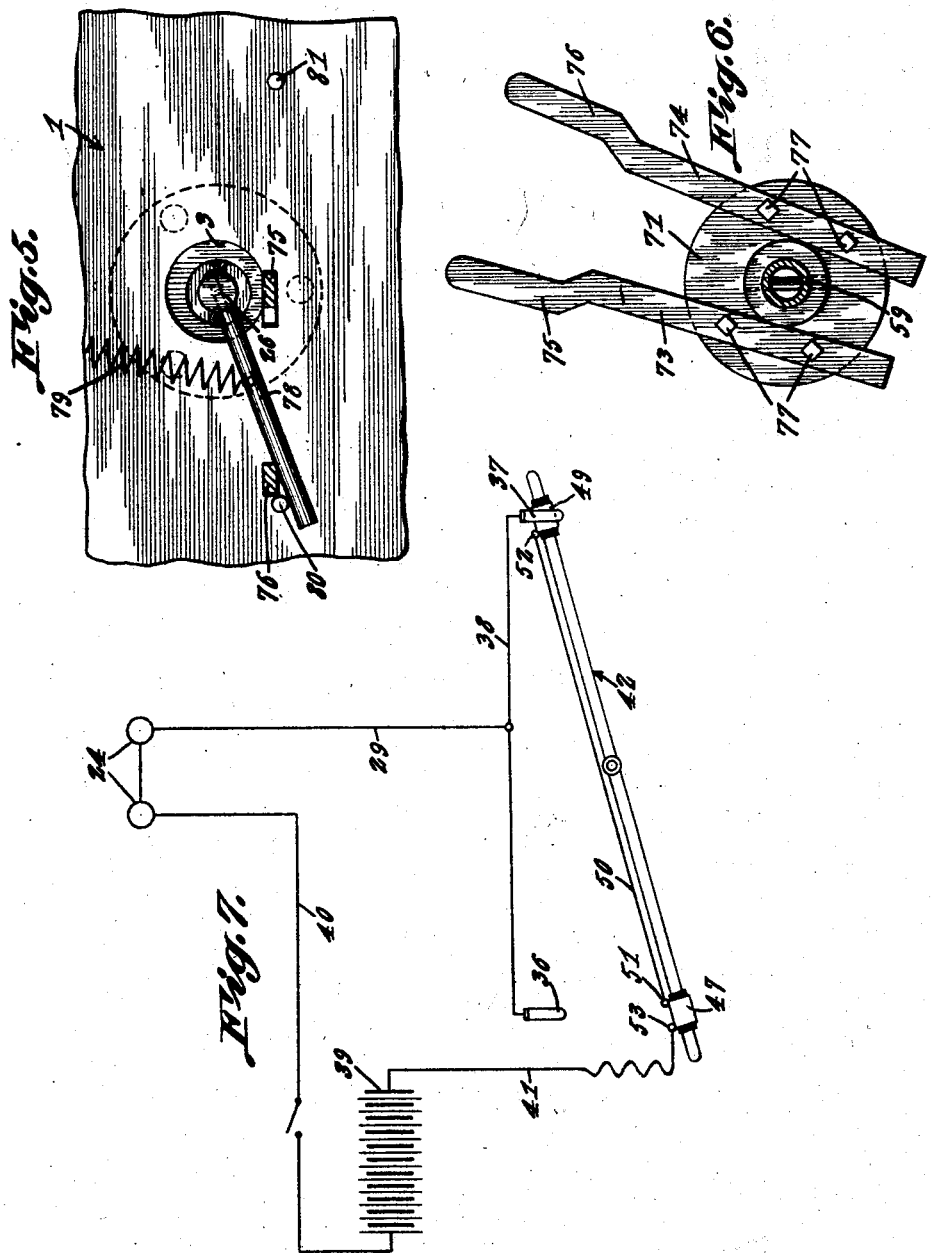
John B. Holtz, INVENTOR.
BY
Geo. P. Kimmel, ATTORNEY.

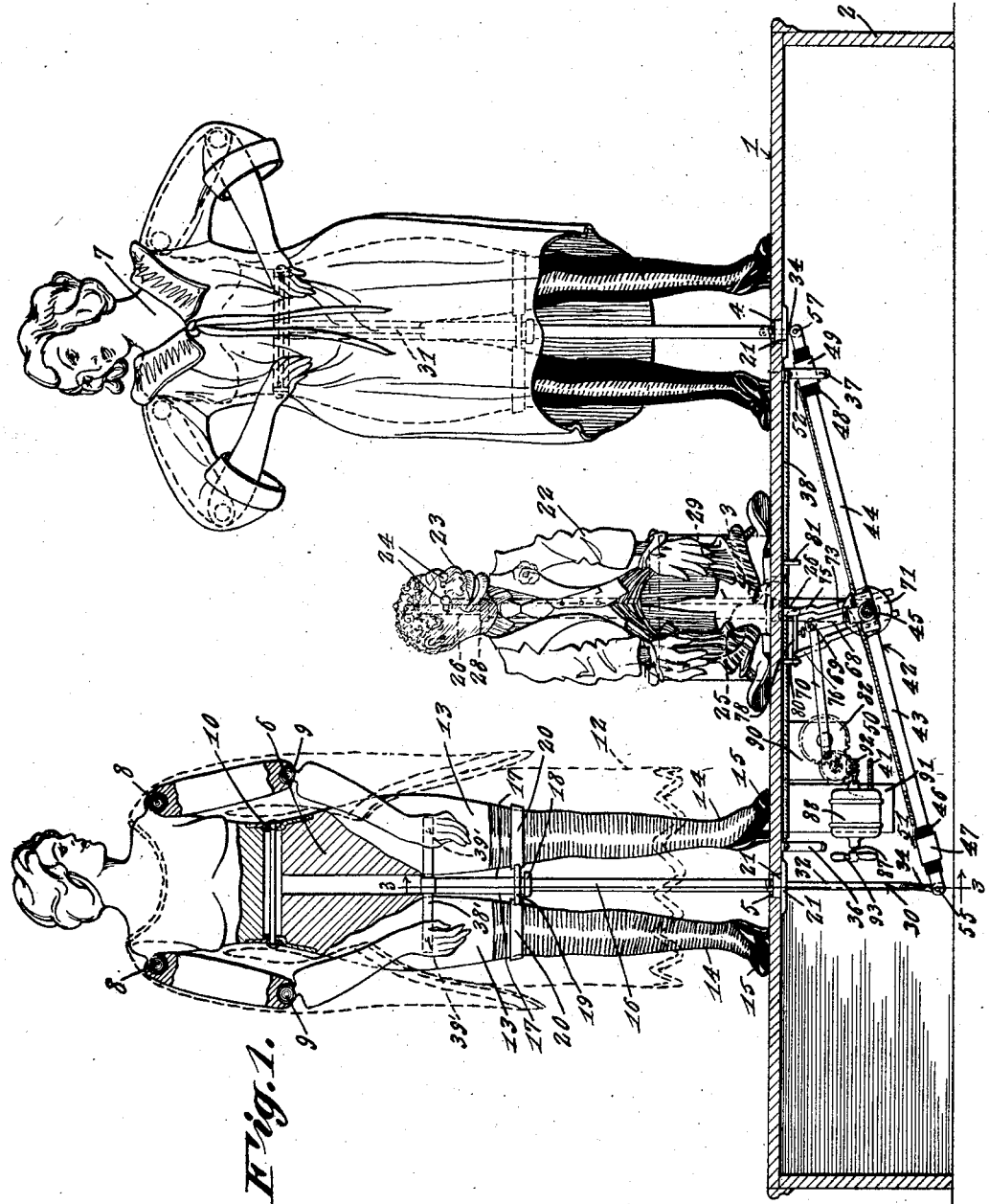

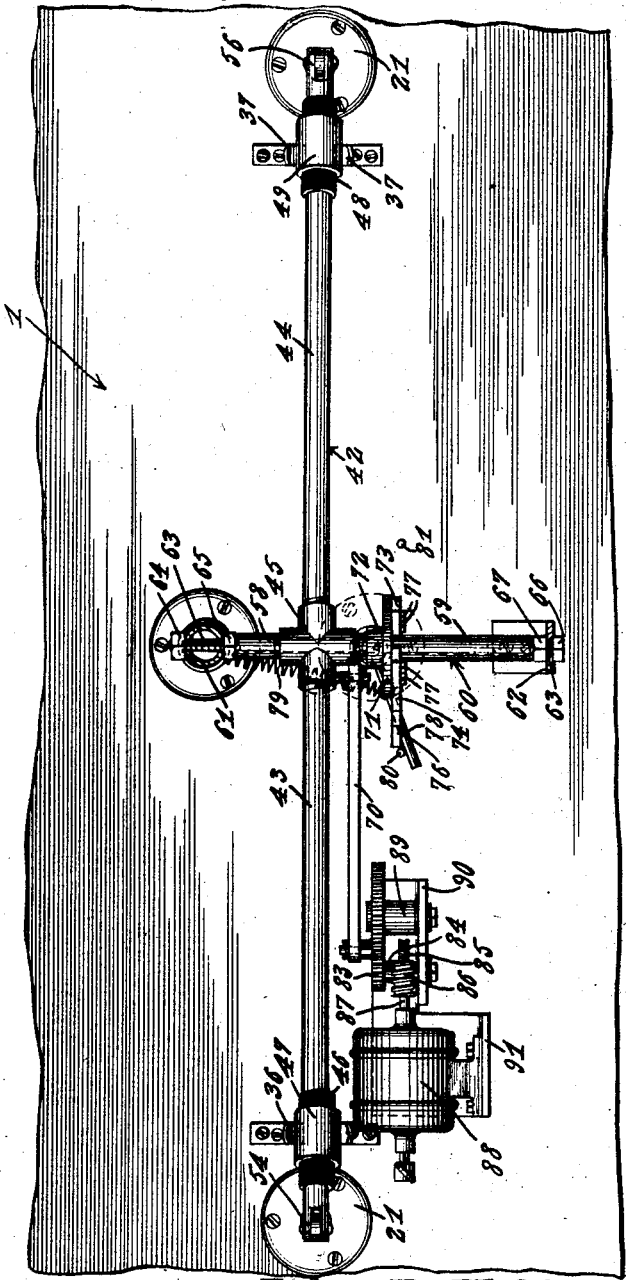

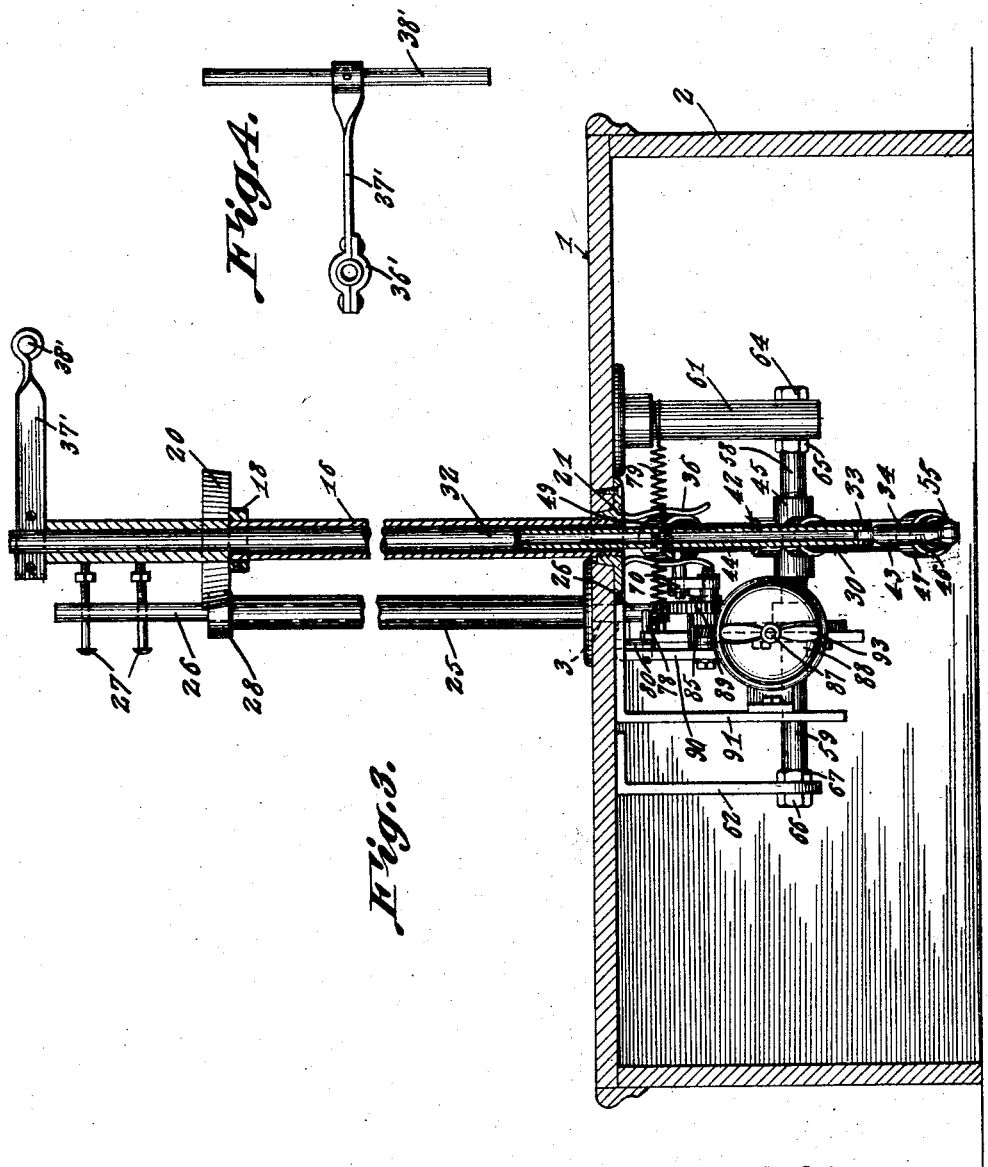

Patented Nov. 17, 1925.

1,562,236

UNITED STATES PATENT OFFICE.

JOHN B. HOLTZ, OF LOS ANGELES, CALIFORNIA.

DISPLAY DEVICE.

Application filed April 15, 1925. Serial No. 23,371.

*To all whom it may concern:*

Be it known that I, JOHN B. HOLTZ, a citizen of the United States, residing at Los Angeles, in the county of Los Angeles and State of California, have invented certain new and useful Improvements in Display Devices, of which the following is a specification.

This invention relates to a display device designed primarily for advertising all grades and classes, necessary and luxurious, of male and female wearing apparel, but it is to be understood that a display device, in accordance with this invention can be employed for displaying or advertising any other class or character of merchandise, or for any purposes, for which it is found applicable, and the invention has for its object to provide, a device of the class referred to, with means for not only displaying wearing apparel positioned similar to that when worn, but furthermore with means for attracting or drawing and holding the attention of a person to the apparel displayed by the device.

A further object of the invention, is to provide, in a manner as hereinafter set forth, a device of the class referred to, with a pair of apparel display elements, each in the form of a life-size manikin, and means for alternately attracting or drawing attention to the apparel displayed by each of said elements.

A further object of the invention, is to provide, in a manner as hereinafter set forth, a device of the class referred to, with a pair of operable apparel display elements, each in the form of a life-size manikin and provided with means for elevating and lowering an article of apparel, the apparel elevating and lowering means of one element operating alternately with respect to that of the other, to expose a normally covered article of wearing apparel positioned on an element, and an operable attraction directing element common to said pair of display elements for alternately attracting or drawing attention to the said exposed articles of apparel on said display elements.

Further objects of the invention are to provide, in a manner as hereinafter set forth, a display device for the purpose set forth, which is simple in its construction and arrangement, strong, durable, compact, thoroughly efficient in its use for display and advertising purposes, readily installed and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood, that changes, variations and modifications can be resorted to which fall within the scope of the claims hereunto appended.

In the drawings wherein like reference characters denote corresponding parts throughout the several views:—

Figure 1, is a sectional front elevation of a display device in accordance with this invention.

Figure 2, is a fragmentary view in sectional plan.

Figure 3, is a fragmentary view in transverse section.

Figure 4, is a top plan of a coupling member forming a part of the elevating and lowering element.

Figure 5, is a plan, partly in section, of the operating means of the attraction directing element.

Figure 6, is a fragmentary view, in side elevation of said operating means.

Figure 7, is a diagrammatic view illustrating the light circuit.

A display device for advertising purposes, in accordance with this invention comprises a pair of operable apparel display elements, each in the form of a life-size manikin in vertical position, an operable attraction directing element common to the display elements and in the form of a comic figure smaller than either of the display elements and constructed to have its head shifted alternately towards the display elements for directing attention to articles of apparel on such display elements, means for elevating and lowering an article of apparel on each of the display elements to expose an article of apparel covered by that article which is elevated and lowered, means for illuminating the head of the directing element after the head of the latter has been turned the desired extent to direct attention to the exposed article of wearing apparel on a display element, an oscillatory member constituting a combined circuit opening and closing device and operating element common to the apparel elevating and lowering means of the said display elements, operating means for said attraction directing element, operating means for said member, and a driving mechanism for said operating means.

The display elements, as well as the atattraction directing element may be constructed partly of wood, with the faces and hands of wax or entirely of wood, or any other workable composition or metal. The display and attraction directing elements are arranged on a platform of the desired width and length. The display elements are arranged in sidewise alignment, but spaced from each other, and the attraction directing element is positioned between but rearwardly of the display elements.

The platform is indicated at 1, and is mounted upon a frame 2 of substantial height. The platform 1 at its transverse center, and between its longitudinal center and rear edge, is formed with a vertically disposed opening 3. The platform 1, between its transverse center and one end thereof, is formed with a vertically disposed opening 4 at the longitudinal center thereof, and at a point between its transverse center and its other end with a vertically disposed opening 5 at the longitudinal center thereof. The openings 4 and 5 are arranged in alignment and the opening 3 rearwardly with respect to the openings 4, 5.

*The display elements.*—One of the display elements is indicated at 6 and the other at 7 and each of said elements are jointed or hinged at the shoulders and elbows, as indicated at 8, 9 respectively. Each of said display elements, is furthermore joined or hinged at the waist line thereof, as indicated at 10, to allow it to slightly bend forward to give the appearance of curtsy.

Each of the display elements has mounted thereon a dress or gown 12, which when in normal position extends to a point a substantial distance below the knees, and each limb 13 is encased by a stocking 14 which is to be exposed when the dress or gown 12 is elevated at the front of the display element as illustrated at the right of Figure 1. Each display element has the feet thereof encased by a pair of slippers 15.

Each of the display elements is sustained in vertical position by a vertically disposed standard formed of a fixed lower section 16 and a shiftable upper section 17 which seats on a collar 18 connected to the upper end of the lower section 16. Secured to the upper section 17, near the bottom thereof, and projecting in opposite directions therefrom is a coupling bar 19, provided at each end with a holder 20 through which extends one of the limbs of the figure. The lower section 16 extends into an opening 4 or 5 and is secured to the platform 1 by a hollow flanged base piece 21. The section 17 permits of elevating the figure above the platform 1 to enable the positioning of the pair of hose and slippers on the figure or changing the hose and slippers when desired. When the device is operated each of the display elements, other than the arms thereof, is held in a stationary position on the platform 1. Although the dress or gown 12 is illustrated as terminating at a point above the ankles of the figure, it is to be understood that the dress or gown 12 can be of a length to extend in close proximity to the platform 1 to conceal or partially conceal the slippers 15.

*The operable attraction directing element.*—As before stated this element is in the form of a comic figure smaller than either of the display elements and said attraction directing element is so constructed to have the head thereof shifted alternately in a direction towards the display elements for directing the attention to articles of apparel thereon. The body of the figure of the attraction directing element is indicated at 22 and the shiftable head at 23. The eyes of the head are formed from a pair of electric lamps 24 and the globes thereof can be of any suitable color whereby, when the head is shifted to position, it will have fixed illumined eyes gazing at an article of apparel on a display element. The attraction directing element is of a height preferably to terminate below the upper ends of the limbs of a figure of a display element and the body 22 is supported by a stationary vertically disposed tubular standard registering with the opening 3. Extending up through the standard 25 is a rod 26 forming a support and a shifting means for the head 23 and holdfast devices 27 are carried by the upper end of the rod 26 for securing the head therewith. The rod 26 carries a collar 28, which abuts at the upper end of the standard 25, for maintaining the rod 26 in said position and which also provides a bearing for said rod and the latter depends below the platform 1. Circuit wire connections 29 extend up through the body 22 and into the head 23 and are connected to the lamps 24.

*The apparel elevating and lowering means.*—Each display element includes an apparel elevating and lowering means and the function thereof is to elevate an article of apparel to expose an article of apparel which is covered by that article elevated and lowered and, as illustrated, the front of the dress 12 is adapted to be elevated to expose the hosiery 14. The elevating and lowering means for one display element is referred to generally by the reference character 30 and the elevating and lowering means for the other display element is indicated generally by the reference character 31. The apparel elevating and lowering means for each of said elements consists of a tubular bar 32 which is of a length to extend through the sections 16 and 17 of a standard and to depend below the platform 1. The lower end of the bar 32, has pivotally connected therewith, as at 33, a link 34, which has its lower end, as at 55, pivotally connected to one end of the combined circuit opening and closing device and operating element referred to as an oscillatory member and which will be hereinafter described. The upper end of the bar 32 has secured therewith as at 36′, as well as projecting laterally therefrom, a coupling member 37′, carrying on its outer end a rod 38′, disposed at right angles with respect to the plane of the member 37′, and said bar 38′ is arranged within the gown or dress 12, and has its ends pivotally connected, as at 39, to the ends of the figure, see Figure 1. The connection 39 extends through the gown or dress 12, and by this arrangement, when the bar 32 is elevated and lowered, the dress or gown 12 will be carried therewith and when the bar 32 is elevated the arms of the figure will assume the position as shown at the right of Figure 1 and when the bar 32 is lowered the arms of the figure will assume the position shown at the left of the Figure 1. When the elevating means 30 moves downwardly the elevating means 31 moves upwardly and when the latter moves downwardly the former moves upwardly. When the means 30 moves upwardly the head 24 of the attraction element turns in a direction towards the display element 6 and when the means 31 moves upwardly the head 23 turns in a direction towards the display element 7.

*The means for illuminating the head of the attraction directing element.*—This means is employed for illuminating the head after the latter has been turned the desired extent to direct the attention to the exposed article of wearing apparel on a display element and which comprises two spaced pair of spaced contacts. One pair is indicated at 36 and associates with display element 6 and the other pair is indicated at 37 and associates with the display element 7. The pair of contacts 36 are electrically connected to the pair of contacts 37 by a conductor 38. By reference to Figure 7, the lamps 24 are in circuit with the conductor 38 by a conductor 29 and leading to the lamps 24 from the battery 39 is a conductor 40 which extends to the oscillatory member to be presently referred to.

*The oscillatory member.*—This member provides a circuit opening and closing device and an operating element common to the apparel elevating and lowering means of the display elements and the said oscillatory member consists of a tubular bar 42 formed of two sections 43, 44, connected together by a four-way coupling 45. The section 43 is provided, at a point removed from its outer end, with a sleeve of insulation 46 and mounted on said sleeve is a contact collar 47 to which the conductor 41 is attached. Mounted on the section 44 at a point removed from its free end is a sleeve 48 of insulation carrying a contact collar 49 which is electrically connected with the collar 47 by a conductor 50. The connection between the conductor 50 and the collar 47 is indicated at 51, the connection between the conductor 50 and the collar 49 is indicated at 52, and the connection between the conductor 41 and the collar 47 is indicated at 53. The outer end of the section 43 is bifurcated as at 54, and extending therein is the lower end of the link 34 of the elevating means 30 and said link is pivotally connected, as at 55, to said section 43. The outer end of the section 44 is bifurcated as at 56 and extending therein is the lower end of the link 34 of the elevating means 31 and the latter is pivotally connected to the section 44, as at 57.

*Operating means for said oscillatory member.*—This operating means is provided for oscillating the member 42 to intermittently open and close the lamp circuit and further for alternately operating the elevating and lowering means 30, 31. The said operating means consists of a tubular rock shaft formed of two sections 58, 59 which are connected to and extend in opposite directions from the four-way coupling 45. Extending through the rock shaft, as well as the coupling 45, is a bar 60, which is connected at one end to a hanger 61 depending from the platform 1 and at its other end is connected to a hanger 62 which also depends from the platform 1. Each end terminal portion of the bar 60 is threaded, as at 63, and provided with a pair of spaced securing nuts. The nuts at one terminal portion are indicated at 64, 65 and those at the other terminal portion at 66, 67. The nuts 64 and 65 abut against the hanger 61 and the nut 65 abuts against the outer end of the section 58. The nuts 66 and 67 abut against the hanger 62 and the section 59 abuts against the nut 67. The tubular shaft rocks on the bar 60 and said shaft is provided with a crank arm 68 which has a pin and slot connection 69 with an operating rod 70 connected to a driving mechanism to be presently referred to.

*Operating means for the attraction directing element.*—This means is employed for alternately shifting the head 23 of the attraction directing element and is so constructed that the head will turn slowly for a portion of its movement and then quickly snap into position with the fixed illuminated eyes, formed by the lamps, gazing at the hosiery on one of the display elements. The said operating means comprises a disk 71 provided with a collar 72 connected to the section 59 of the tubular shaft and secured to the disk 71 is a pair of up-standing diverging shifting bars 73, 74 arranged in spaced relation. The upper part of the bar 73 is off set as at 75 and the upper part of the bar 74 is off set as at 76. The off set portions 75 and 76 are oppositely disposed with respect to each other and the said bars 73, 74 are secured to the disk 71 by the holdfast devices 77. Secured to the lower end of the rod 26 is a turning arm 78 which extends between the bars 73, 74 and the arm 78 is moved in one direction by the upper part 75 of the bar 73 and in the other direction by the upper part 76 of the bar 74. The movement imparted to the arm 78 by the rods 73 and 74, is slow until said arm 78 is acted upon by a pulling string 79 and the action of the latter is such as to snap the head 23 in position. The spring 79 is connected to the arm 78 and to the hanger 61 and is normally disposed at an inclination. The movement of the arm 78 is arrested in either direction by a stop, and the stops are formed by depending pins 80, 81 spaced from each other and secured to the platform 1. The disk 71 is oscillated from the tubular shaft whereby the action of the bars 73 and 74, upon the arm 78, will alternately turn or shift the bar 26 in opposite directions so that the head will be shifted alternately towards the display elements and the quick snap of the head in either direction is had when the sleeves 47 and 49 engage the contacts 36, 37 for the purpose of illuminating the lamps 24. The turning of the head 24 is had simultaneously with the elevating of the skirt or gown 12 and the action of the parts is such that when the gown or dress 12 is at the limit of its upward shift, the head 23 will be snapped in position. As the skirt of one display element lowers, the head 23 will start to shift in the opposite direction and by the time the dress or gown 12 on the other display element is at the limit of its upward shift, the head will be snapped in position to direct attention to the hosiery on the said last mentioned display element.

*The driving mechanism.*—This mechanism is employed for actuating the rod 70 to cause the operation in alternate directions of the apparel elevating means of the display elements and the means for turning the head of the attraction directing element. The said driving means includes a gear wheel 82, to which the rod 70 is eccentrically and pivotally connected. The gear wheel 82 is operated from a pinion 83 carried by a countershaft 84, provided with a worm wheel 85, operated through the medium of a worm 86 carried on the projecting end of the shaft 87, of an electric motor 88. The gear wheel 82 is carried by a shaft 89. Supporting means for the shafts 85, 89 is indicated at 90 and a support for the motor 88 is indicated at 91. The supports 90 and 91 are in the form of hangers and depend from the platform 1. The motor 88 is in the light or lamp circuit and the leading-in wires for the motor are indicated at 92. The motor shaft 87 is also extended and carries a fan 93.

The general operation of the display device is such that when one manikin has elevated the skirt of a gown displaying the hosiery, the little comic figure slowly turns his head as the gown skirt is being raised, and just as it has reached its height the figure's head snaps into position with fixed illuminated eyes gazing at the hosiery, then the figure with the elevated skirt begins to lower the skirt and the other female figure begins to raise hers and the figure's head begins to turn, and when the second skirt has reached the desired height the comic's gaze will be as it was in the case of the first figure. This operation is continuously, alternating one from the other. The figures can be fully dressed or partially dressed if displaying under garments.

It is thought the many advantages of a display device, in accordance with this invention, for advertising purposes can be readily understood, and although the preferred embodiment of the invention is as illustrated and described, yet it is to be understood that changes in the detail of construction can be had which will fall within the scope of the invention as claimed.

What I claim is:—

1. A wearing apparel display device comprising a pair of vertically disposed apparel supporting and displaying elements each adapted to support a plurality of articles of wearing apparel and each including means for elevating and lowering one of the articles supported thereon to respectively expose and cover another of the articles supported thereon, operating mechanism common to the said means of both elements for alternately elevating and lowering the said means of one element with respect to said means of the other element, an attraction directing element common to and positioned between said pair of display elements and including a movable part alternately shiftable in opposite directions towards said display elements for directing attention to the exposed article, and an actuating means for said movable part driven from said operating mechanism.

2. A wearing apparel display device comprising a pair of vertically disposed apparel supporting and displaying elements each adapted to support a plurality of articles of wearing apparel and each including means for elevating and lowering one of the articles supported thereon to respectively expose and cover another of the articles supported thereon, operating mechanism common to the said means of both elements for alternately elevating and lowering the said means of one element with respect to said means of the other element, an attraction directing element common to and positioned between said pair of display elements and including a movable part alternately shiftable in opposite directions towards said display elements for directing attention to the exposed article, an actuating means for said movable part driven from said operating mechanism, and means coacting with said operating mechanism for intermittently illuminating said movable part immediately preceding the limit of its movement in either direction.

3. A wearing apparel display device comprising a pair of vertically disposed apparel supporting and displaying elements each adapted to support a plurality of articles of wearing apparel and each including means for elevating and lowering one of the articles supported thereon to respectively expose and cover another of the articles supported thereon, operating mechanism common to the said means of both elements for alternately elevating and lowering the said means of one element with respect to said means of the other element, an attraction directing element common to and positioned between said pair of display elements and including a movable part alternately shiftable in opposite directions towards said display elements for directing attention to the exposed article, an actuating means for said movable part driven from said operating mechanism, and means connected with said movable part for imparting a snapping action thereto to complete the movement thereof in either direction.

4. A wearing apparel display comprising a pair of vertically disposed apparel supporting and displaying elements each adapted to support a plurality of articles of wearing apparel and each including means for elevating and lowering one of the articles supported thereon to respectively expose and cover another of the articles supported thereon, operating mechanism common to the said means of both elements for alternately elevating and lowering the said means of one element with respect to means of the other element, an attraction directing element common to and positioned between said pair of display elements and including a movable part alternately shiftable in opposite directions towards said display elements for directing attention to the exposed article, an actuating means for said movable part driven from said operating mechanism, means coacting with said operating mechanism for intermittently illuminating said movable part immediately preceding the limit of its movement in either direction, and means connected with said movable part for imparting a snapping action thereto to cause the movement thereof in either direction.

5. A wearing apparel display device comprising a vertically disposed apparel supporting and displaying element adapted to support a plurality of articles of wearing apparel and provided with means for elevating and lowering one of the articles supported thereon, to respectively expose and cover another of the articles supported thereon, an attraction directing element positioned in proximity to said display element and including a movable part shiftable in a direction towards said display element to direct attention to said exposed article, and an operating mechanism common to said means and said movable part.

6. A wearing apparel display device comprising a vertically disposed apparel supporting and displaying element adapted to support a plurality of articles of wearing apparel and provided with means for elevating and lowering one of the articles supported thereon to respectively expose and cover another of the articles supported thereon, an attraction directing element positioned in proximity to said display element and including a movable part shiftable in a direction towards said display element to direct attention to said exposed article, an operating mechanism common to said means and said movable part, and means coacting with said operating mechanism for illuminating said movable part when in attraction directing position.

7. A wearing apparel display device comprising a vertically disposed apparel supporting and displaying element adapted to support a plurality of articles of wearing apparel and provided with means for elevating and lowering one of the articles supported thereon to respectively expose and cover another of the articles supported thereon, an attraction directing element positioned in proximity to said display element and including a movable part shiftable in a direction towards said display element to direct attention to said exposed article, an operating mechanism common to said means and said movable part, and means connected with said movable part for imparting a snapping action thereto to complete the movement thereof to attraction directing position.

8. A wearing apparel display device comprising a pair of vertically disposed apparel supporting and displaying elements each adapted to support a plurality of articles of wearing apparel and each including means connected to one of the articles supported thereby for elevating and lowering such article to respectively expose and cover another of the articles supported thereon, operating mechanism common to the said means of both elements for alternately elevating and lowering said means of one element with respect to the said means of the other element, and attraction directing element common to and positioned between said pair of display elements and including a movable part shiftable in opposite directions towards said display elements for directing attention alternately to the exposed article, and an actuating means for said movable part driven from said operating mechanism and prividing for the shifting of the movable part towards an element during the elevation of an article and away from such element on the lowering of the article.

9. A wearing apparel display device comprising a pair of vertically disposed apparel supporting and displaying elements each adapted to support a plurality of articles of wearing apparel and each including means connected to one of the articles supported thereby for elevating and lowering such article to respectively expose and cover another of the articles supported thereon, operating mechanism common to the said means of both elements for alternately elevating and lowering said means of one element with respect to the said means of the other element, an attraction directing element common to and positioned between said pair of display elements and including a movable part shiftable in opposite directions towards said display elements for directing attention alternately to the exposed articles, an actuating means for said movable part driven from said operating mechanism and providing for the shifting of the movable part towards an element during the elevation of an article and away from such element on the lowering of the article, and means coacting with said operating mechanism for illuminating said movable part when in attraction directing position.

10. A wearing apparel display device comprising a pair of vertically disposed apparel supporting and displaying elements each adapted to support a plurality of articles of wearing apparel and each including means connected to one of the articles supported thereby for elevating and lowering such article to respectively expose and cover another of the articles supported thereon, operating mechanism common to the said means of both elements for alternately elevating and lowering said means of one element with respect to the said means of the other element, an attraction directing element common to and positioned between said pair of display elements and including a movable part shiftable in opposite directions towards said display elements for directing attention alternately to the exposed articles, an actuating means for said movable part driven from said operating mechanism and providing for the shifting of the movable part towards an element during the elevation of an article and away from such element on the lowering of the article, and means connected with said movable part for imparting a snapping action thereto to complete the movement thereof to attraction directing position.

11. A wearing apparel display device comprising a pair of vertically disposed apparel supporting and displaying elements each adapted to support a plurality of articles of wearing apparel and each including means connected to one of the articles supported thereby for elevating and lowering such article to respectively expose and cover another of the articles supported thereon, operating mechanism common to the said means of both elements for alternately elevating and lowering said means of one element with respect to the said means of the other element, an attraction directing element common to and positioned between said pair of display elements and including a movable part shiftable in opposite directions towards said display elements for directing attention alternately to the exposed articles, an actuating means for said movable part driven from said operating mechanism and providing for the shifting of the movable part towards an element during the elevation of an article and away from such element on the lowering of the article, means coacting with said operating mechanism for illuminating said movable part when in attraction directing position, and means cooperating with said operating mechanism for illuminating said movable part when in attraction directing position.

12. A wearing apparel display device comprising a vertical disposed apparel supporting and display element for supporting a plurality of articles of wearing apparel and provided with a pair of shiftable members connected with one of the articles for elevating and lowering the latter to respectively expose and cover another of the articles on said element, operating mechanism connected with said members for elevating and lowering the same, each of said members formed of a plurality of shiftable jointed sections, said members of a length less than the height of said element, an attraction directing element positioned in proximity to said display element and including a movable part shiftable towards the display element on the elevation of one article for directing attention to the exposed article, and actuating means for said movable part driven from said operating mechanism.

13. A wearing apparel display device comprising a vertically disposed apparel supporting and display element for supporting a plurality of articles of wearing apparel and provided with a pair of shiftable members connected with one of the articles for elevating and lowering the latter to respectively expose and cover another of the articles on said element, operating mechanism connected with said members for elevating and lowering the same, each of said members formed of a plurality of shiftable jointed sections, said members of a length less than the height of said element, an attraction directing element positioned in proximity to said display element and including a movable part shiftable towards the display element on the elevation of one article for directing attention to the exposed article, actuating means for said movable part driven from said operating mechanism, and means coacting with said operating mechanism for illuminating said movable part when in attraction directing position.

14. A wearing apparel display device comprising a vertically disposed apparel supporting and display element for supporting a plurality of articles of wearing apparel and provided with a pair of shiftable members connected with one of the articles for elevating and lowering the latter to respectively expose and cover another of the articles on said element, operating mechanism connected with said members for elevating and lowering the same, each of said members formed of a plurality of shiftable jointed sections, said members of a length less than the height of said element, an attraction directing element positioned in proximity to said display element and including a movable part shiftable towards the display element on the elevation of one article for directing attention to the exposed article, actuating means for said movable part driven from said operating mechanism, means coacting with said operating mechanism for illuminating said movable part when in attraction directing position, and means connected with said movable part for imparting a snapping action thereto to complete the movement thereto to attraction directing position.

In testimony whereof, I affix my signature hereto.

JOHN B. HOLTZ.